United States Patent [19]
Soehring et al.
[11] 3,896,491
[45] July 22, 1975

[54] SETTING MECHANISM FOR THE PICKUP HEAD OF A DISC STORAGE SYSTEM, ESPECIALLY FOR TEACHING PURPOSES

[75] Inventors: Gerhard Soehring, Dossenheim; Gerhard Kreutze, Bammental; Guenther Obstfelder, Leimen, all of Germany

[73] Assignee: Badische Anilin- & Soda-Fabrik Aktiengesellschaft, Ludwigshafen am Rhine, Germany

[22] Filed: Oct. 16, 1973

[21] Appl. No.: 406,973

[30] Foreign Application Priority Data

Oct. 21, 1972 Germany ............................ 2251786

[52] U.S. Cl. ............ 360/86; 179/100.4 R; 360/105; 360/107; 360/109

[51] Int. Cl. .. G11b 5/54; G11b 21/08; G11b 25/04

[58] Field of Search ....... 360/105, 97, 107, 86, 109, 360/75, 77, 78; 179/100.4 C, 100.41 K, 100.41 S, 100.4 R; 35/35 C; 274/105, 9, 13, 23 A, 14

[56] References Cited

UNITED STATES PATENTS

| | | | |
|---|---|---|---|
| 3,019,421 | 1/1962 | Saylor | 360/86 |
| 3,060,940 | 10/1962 | Fujimoto | 360/86 |
| 3,298,009 | 1/1967 | Domich et al. | 360/86 |
| 3,369,813 | 2/1968 | Nagashina et al. | 360/107 |
| 3,626,113 | 12/1971 | Jones et al. | 360/107 |
| 3,638,954 | 2/1972 | Kato | 360/107 |
| 3,646,259 | 2/1972 | Schuller | 360/86 |

*Primary Examiner*—Alfred H. Eddleman
*Attorney, Agent, or Firm*—Johnston, Keil, Thompson & Shurtleff

[57] ABSTRACT

The setting mechanism for the pickup head of a disc storage system for recording and reproducing electric signals consists essentially of rigid connecting means between head support and guide element, means for pivoting the head support about a predetermined axis, an actuating element for causing the guide element to engage a spindle and to disengage therefrom, and shift elements which constitute a shift mechanism for the head support. A setting mechanism of this type is of very simple design and easy to manufacture. The device can advantageously be applied to sound recording and reproducing equipment, for example teaching machines, but also to video recorders and data storage equipment.

5 Claims, 4 Drawing Figures

SETTING MECHANISM FOR THE PICKUP HEAD OF A DISC STORAGE SYSTEM, ESPECIALLY FOR TEACHING PURPOSES

This invention relates to a setting mechanism for at least one pickup head of a disc storage system for recording and reproducing electric signals, especially audio signals of instructional programs, comprising a threaded spindle capable of being driven so as to rotate about its own axis which is arranged above a turntable for a storage disc to which a rotary movement is imparted by drive means, a guide element arranged on a pickup support displaceable in the direction of the spindle axis being capable of engaging at least one turn of the thread on the spindle.

A transport mechanism for the magnetic head of a disc storage system is disclosed in German Published Application No. 1,958,508 with which a slow-motion effect can be achieved in the reproduction of television signals. This known device consists of a threaded spindle arranged radially above the storage disc and capable of being rotated by means of a stepping motor, a head carriage mounted on the spindle in such a way that it can be slidably displaced in the axial direction of the spindle by means of a guide pin engaging the turns of the thread or the spindle one after the other. The turntable for the storage disc is caused to rotate by a conventional d.c. motor. This known device is made expensive through the use of a stepping motor for rotating the spindle, and is extremely sensitive because there has to be a fixed ratio between the rotary movement of the stepping motor and the rotation of the turntable if recordings are to be reproduced satisfactorily. The necessary correlation between the rotary movement of the stepping motor and that of the turntable can only be ensured by additional means, for example an electronic control system. Furthermore, an arrangement in which the head is displaced by means of a guide pin continuously sliding in a thread is unreliable and liable to develop faults. Besides, it requires a very light head carriage.

An object of the invention is to provide an improved setting mechanism for the pickup head of a disc storage system and to simplify the manufacture and operation of such a mechanism.

This object is achieved by a setting mechanism for at least one pickup head of a disc storage system for recording and reproducing electric signals, especially audio signals of instructional programs, comprising a threaded spindle capable of being driven so as to rotate about its own axis which is arranged above a storage disc turntable rotated by drive means, a guide element being arranged on a head support displaceable in the direction of the spindle axis and engaging at least one turn of the thread on the spindle, wherein there is provided a rigid connection between head support and guide element, means for pivoting the head support about an axis parallel with the spindle axis, an actuating member for causing the guide element to engage the spindle or to disengage therefrom and a shift mechanism for the pickup head consisting of a first shift element on the head support and a second shift element on the actuating member, the said shift elements engaging one another when the actuating member is operated.

In a further embodiment of the invention, the pitch of the spindle thread is equal to distance between the tracks on the storage disc. In this way, positive accurate setting of the pickup head relative to any desired track on the storage disk is achieved. This enables different recordings, such as teacher and pupil speech, to be arranged in the desired sequence or desired portions of the recording to be retrieved quickly for playback. The setting mechanism of the invention is of particular value in language teaching applications. It is however also possible to employ the mechanism of the invention for retrieving video or data signals. The mechanism can also be employed successfully on record players of all kinds.

In an advantageous embodiment of the invention, the shift elements of a shift mechanism remain constantly engaged with one another.

In this way the mechanism can be set to any desired track by operating the actuating member, and if this is coupled to an external indicating device, it is possible to read off the setting of the head at any given moment.

In a further advantageous embodiment of the invention, the spindle is coupled to the rotary shaft of the storage disc turntable via a transmission operating with a 1:1 ratio, which facilitates manufacture and maintenance. In such an arrangement the actual number of revolutions of the turntable is directly utilized for the purpose of rotating the spindle and thus of setting the pickup head, and positive coupling is achieved which excludes head positioning errors.

In yet another advantageous embodiment of the invention, the guide element is in the form of a clasp nut. The plurality of threads of a clasp nut make the conversion of the rotary movement of the spindle into the axial movement of the head support more reliable. Besides, they render the mechanism vibration-proof and thus capable of being operated without difficulty also by unskilled operators or pupils.

In an even further advantageous embodiment of the invention, the actuating member is in the form of a depressible-rotary-knob mechanism. In such an arrangement, coupling and decoupling between guide element and spindle may be achieved by depressing the knob, and the desired setting of the head relative to the track or tracks can be achieved by means of the shift mechanism. Moreover, a simple indicating device, e.g. with index and scale, may be combined with the external knob.

According to the invention, the shift mechanism consists of a rack on the head support and a pinion on the actuating member. In the case of a magnetic disc storage device it is possible, according to the invention, to position at least one magnetic head on the head support in such a way that the centers of the head gap or gaps are arranged symmetrically with respect to a disc radius parallel with the spindle axis. In this way, optimum head/track settings are achieved.

In a particularly advantageous embodiment of the invention, the pickup arm of an apparatus for reproducing audio and/or video and/or data signals stored in the grooved tracks of a storage disc is connected to an arm support displaceable on a spindle by means of a clasp nut, the spindle extending in a direction approximately tangential to the grooved tracks, so that a pickup head provided on the pickup arm is continuously movable radially relative to the grooved tracks when disc and spindle rotate and can be lowered onto, or lifted from, the grooved tracks after the clasp nut has been made to engage the spindle or to disengage therefrom with the aid of pivoting means and a shift mechanism for the pickup arm support. This ensures optimum guidance of the pickup head with low mechanical stress on the grooved tracks in the case of storage discs provided with grooved tracks, e.g. sound or video records.

Further details of the invention are disclosed in the following description of the embodiments thereof illustrated in the attached drawings, in which FIG. 1 is a diagrammatic representation of a disc storage system for educational purposes.

Figure 1:
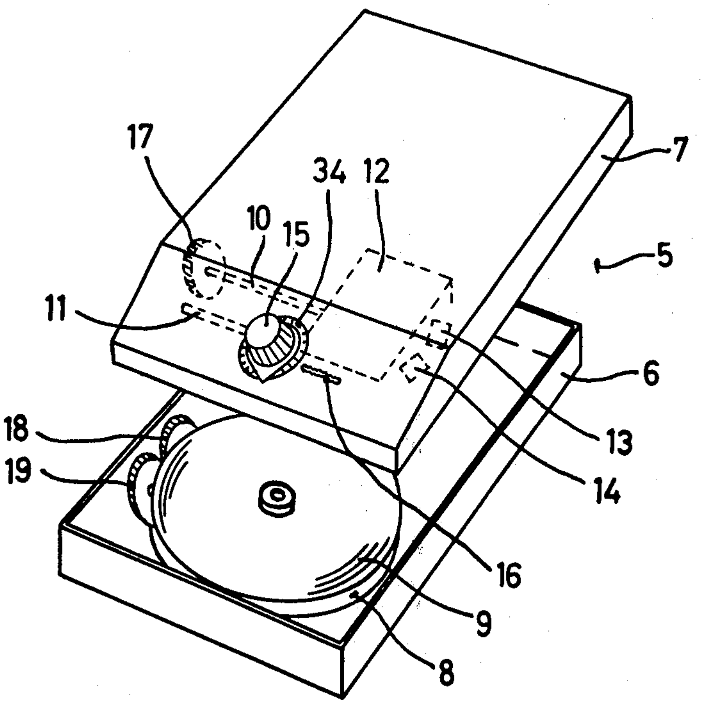

The disc storage unit 5 consists of a lower part 6 and an upper part 7, a driven turntable 8 in the lower part 6 on which a magnetic disc 9 with a spiral track is placed, a head support 12 with recording and erasing heads 13 and 14 which is displaceably mounted in the upper part 7 on a single-thread spindle 10 and a guide rod 11, and a rotary knob 15 with index which cooperates with a rack 16 provided on the head support 12. At one end of the spindle 10 there is mounted a gear wheel 17 which engages a gear wheel 18 when the upper part 7 is closed, whereas a gear wheel 19 meshing with the gear wheel 18 is arranged on a shaft 20 of the turntable 8. The shaft 20 transmits the actual speed of the turntable 8 via a bevel gearing 21 and the combined gearing 19, 18 and 17 with a transmission ratio of 1:1 to the spindle 10 which therefore revolves about its own axis 22 once per disc revolution. This ensures that the magnetic head is always positively positioned above the magnetic track. The turntable 8 is driven at its periphery by means of a friction wheel 23 which in turn is driven by means of a capstan 24 on a flywheel 25, the latter being rotated by means of a drive motor (not shown) via a belt 26. The turntable may also be rotated by any other known type of drive system.

Figure 2:
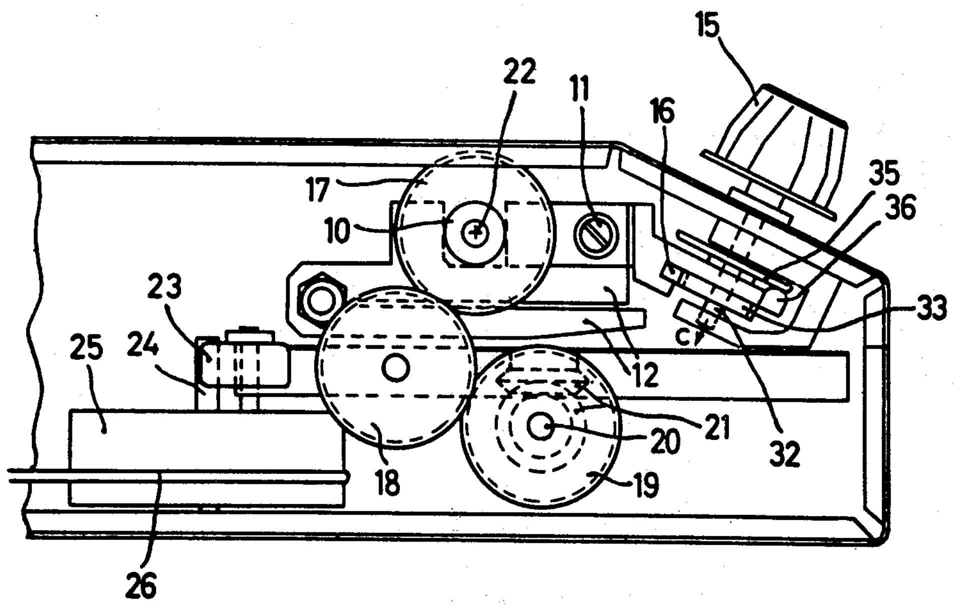
FIG. 2 is a side elevation of the disc storage system according to FIG. 1.
Figure 3:
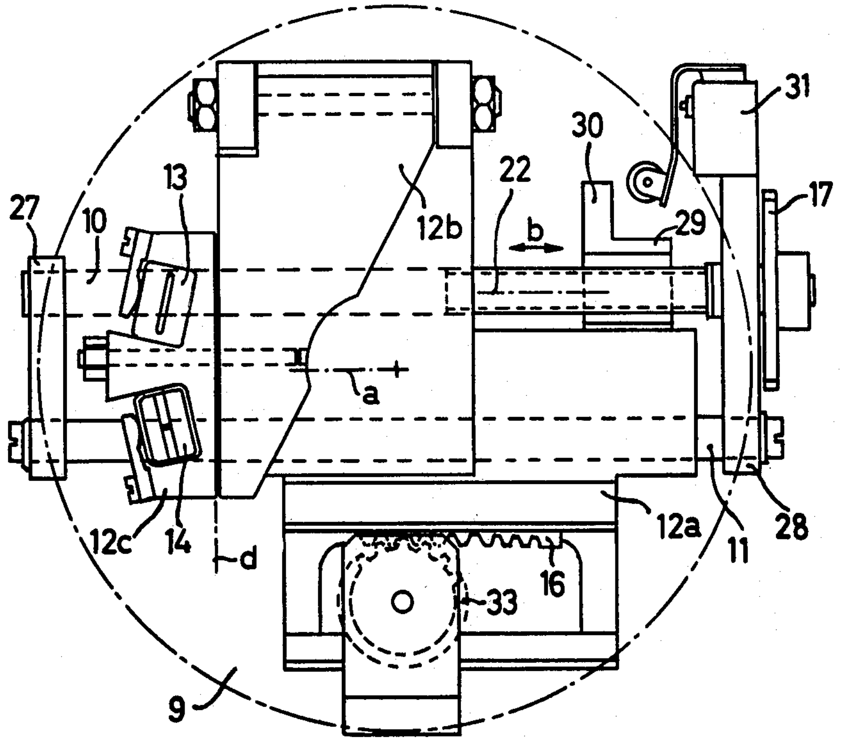
FIG. 3 is a plan view of the disc storage system according to FIGS. 1 and 2.

The spindle 10 is rotatably mounted in suitable manner between chassis supports 27 and 28. A rod 11 is rigidly mounted between the supports 27 and 28. The head support 12 consists of a fixed block 12*a*, a part 12*b* pivotally mounted on the chassis and sprung relative to the block 12*a*, the actual head support portion 12*c* with recording and reproducing head 13 and erasing head 14 being supported on the portion 12*b* so as to pivot about an axis *d*. The recording and erasing heads are arranged symmetrically with respect to a radius *a* which runs parallel with the spindle axis 22. Alternatively, a combination head may be arranged in the same manner. The gaps of the heads 13 and 14 are aligned approximately in the direction in which the track of the storage disc 9 extends, the latter being shown in FIG. 3 in order to illustrate the relative position of all the parts of the system. Rigidly mounted on the block 12*a* of the head support 12 is a commercially available clasp nut 29 having a plurality of thread turns. It is also possible to employ several clasp nuts. The movement of the clasp nut 29 and thus of the head support 12 is indicated by the double arrow *b*. A stop 30 on the clasp nut 29 actuates a switch 31 which, when the nut has reached its end position on the spindle 10, switches off the drive motor in order to avoid damage to the thread. As is clear from FIGS. 2 and 3 in particular, the rotatable shaft 32 of the rotary knob 15, which can be depressed in the direction of arrow *c*, is provided with a toothed wheel 33, the teeth of which mesh with the teeth of the rack 16 whatever the position of the rotary knob 15, the rack being rigidly mounted on the head support 12 or, more precisely, on the block 12*a*. The pitch of the teeth on the pinion 33 and the rack 16 are chosen according to setting requirements. The distance between tracks on storage discs for educational purposes of the type referred to is 0.75 mm. For every revolution of the motor-driven spindle the magnetic head is displaced by an amount corresponding to the distance separating two tracks (track center to track center). Moreover, when the head support 12 is pivoted and the clasp nut 29 is thus disengaged from the spindle 10, rotation of the knob 15 enables the head to be displaced over the entire length of the spiral track. This ensures in a simple manner rapid retrieval of stored signals. The head support 12 can be pivoted about the rod 11 by depressing the rotary knob 15 in direction *c*. In this operation the pinion 33 and the rack are not disengaged and the fixed correlation between track and head setting is retained. Especially when there are only a few tracks on the disc (short spiral track), it is possible to choose tooth pitches for the shift elements 16 and 33 in an integral ratio to the spindle pitch or to replace rack and pinion by a suitable ratchet device, in order to establish a fixed relationship between the shift mechanism and the tracks and, possibly, an indicating scale, so that the momentary track position of the head can be read off directly. A disc 35 rigidly mounted on the knob shaft 32 makes contact with the stop 36 on the head support 12 and the latter is pivoted about the rod 11 so that the clasp nut 29 is pivoted, i.e. disengaged from the thread of the spindle 10. A compression spring (not shown) may be used to maintain the position of the knob 15 in opposition to the direction *c*, so that the clasp nut constantly engages the thread of the spindle except when decoupled. FIG. 1 shows the rotary knob 15 provided with a pointer which can be turned above an annular scale 34. This makes it possible to record, play back or erase at predetermined fixed points without pronlonged searching. The above-described system has proved very successful in practice. Its compact, sturdy construction makes it suitable for instructional purposes.

Obviously, it is possible to apply the features of the present invention for example also to the construction of record players or similar equipment in which the setting of the pickup member relative to a track on the record is to be improved.

Figure 4:
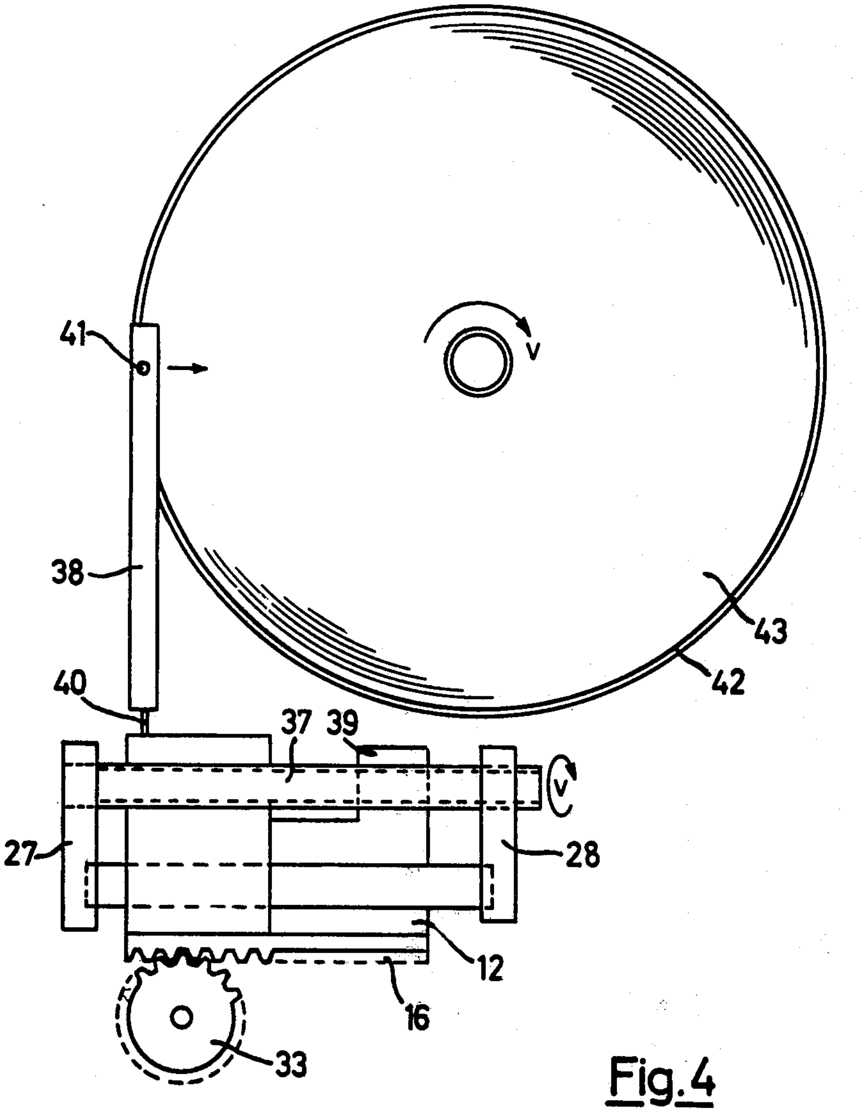
FIG. 4 shows the mechanism of the invention in conjunction with a record player.

FIG. 4 shows an advantageous arrangement for achieving the exact displacement of a pickup head 41 relative to a spiral track 42 in which a pickup arm 38 is mounted via a support 12, with clasp nut 39, on, for example, a single-thread spindle 37. Between the support 12 and the pickup arm 38 a leaf spring 40 perpendicular to the surface of the disc 43 ensures that the pickup arm 38 can only be pivoted in a plane parallel to the disc surface. Suitable means are used to ensure that the pickup head 41 descends on a disc 43, e.g. a grammophone record, for example at a point on the radius determined by the position of the pickup head 41 illustrated in the drawing. As the disc 43 is made to rotate by suitable drive means, the actual rotation (arrow *v*) of the disc 43 is transmitted to the spindle 37 in a way similar to the above-described example of the magnetic storage system, so that accurate displacement of the head is achieved. Owing to the tangential arrangement of the spindle 37 relative to the grooved tracks or a spiral track 42, the disc is scanned in a manner largely analogous to the disc cutting process because the cutting stylus is likewise moved radially across the disc. The mechanical stress exerted on the tracks by the pickup arm and head is therefore reduced to a minimum. The stress on the grooves can be further reduced by optimum weighting of the pickup arm 38. This embodiment also comprises a pivoting device for the pickup arm support 12 not shown here in further detail and corresponding to the mechanism illustrated in FIGS. 2 and 3, and a shift mechanism (16, 33) for the support 12 for setting the pickup head. The shift mechanism (16, 33) can be adapted to the track length and distance separating the tracks by selecting an appropriate pitch in order to ensure rapid but sufficiently accurate head setting. The employment of suitable damping means for the pickup arm during raising and lowering of the head further reduces mechanical damage to track and pickup head. The embodiment described here provides much improved guidance of the pickup arm and also exhibits a head setting mechanism for lowering the head at any desired point on the track.

We claim:

1. In a disc storage apparatus for recording or reproducing electric signals from a disc carrying said signals in a spiral track, said storage apparatus having a recording or reproducing head mounted on a support for radial movement in selective contact with a revolution of the track on said recording disc, a turntable upon which the disc may be placed and a drive means for rotating said turntable and said disc, the improvement which comprises: a spindle threaded along its length and rotatably mounted adjacent to said turntable, said threaded spindle having a thread pitch equal to the distance between two revolutions at the track on the disc; rotation transmitting means interposed between the drive means and said threaded spindle for simultaneously and synchronously rotating the turntable and said threaded spindle; a threaded guide element arranged on said head support for engagement with said threaded spindle; a guide means arranged parallel to the threaded spindle whereon the recording head support is translationally and pivotally mounted, said translational movement being along the axis of said guide means, said pivotal movement being about the axis of said guide means, said pivotal movement resulting in the disengaging of said threaded guide element and simultaneously moving the head out of contact with the disc; a rack on the recording head support, said rack being arranged parallel to said guide means, said rack having teeth of a given size and pitch; a pinion having teeth of said given size and pitch carried by an actuating member, said pinion being arranged for continuous engagement with said rack, said actuating member being connected to the recording head support and being manually operable in two different modes, in the first of said modes the turning of said actuating member effecting rotational movement of the pinion and lateral movement of the rack and head support, while the said movement is guided via the said threaded guide element which cooperates with the said threaded spindle and thereby ensures a movement of the head for selectively accurate contact with a desired one of the tracks and in the second of said modes the depressing and subsequent turning of said actuating member pivoting the support to move the head out of contact with the disc and simultaneously disengaging the threaded guide element from the threaded spindle for free lateral movement of the rack and head support upon turning of said actuating member.

2. Apparatus as in claim 1, in which the guide element is in the form a clasp nut.

3. Apparatus as in claim 1, in which the actuacting member. is a mechanism operating with a rotary knob which can be depressed.

4. Apparatus as in claim 1, in which at least one magnetic head is supported on the head support, the centers of the magnetic gap or gaps being arranged symmetrically with respect to a radius of the turntable which extends parallel with the spindle axis.

5. A playback apparatus as in claim 1 playback apparatus for signals recorded in the grooved tracks of a storage disc, wherein the pickup head is mounted on a pickup arm which is connected to a pickup arm support displaceably mounted on the spindle by means of a clasp nut, the spindle extending in a direction substantially tangential to the grooved tracks, so that the pickup head is continuously movable radially relative to the grooved tracks when the disc and the spindle rotate and, by means of a shift mechanism for the pickup arm support, can be lowered onto the grooved tracks or detached therefrom after the clasp nut has been made to engage the spindle, or to disengage therefrom with the aid of pivoting means.

* * * * *